United States Patent [19]
Thuen et al.

[11] Patent Number: 5,544,916
[45] Date of Patent: * Aug. 13, 1996

[54] TWO PIECE INFLATOR HOUSING

[75] Inventors: Torbjorn Thuen, Morris Plains; Allen Breed, Boonton Township, both of N.J.

[73] Assignee: Breed Automotive Technology, Inc., Lakeland, Fla.

[ * ] Notice: The portion of the term of this patent subsequent to Apr. 13, 2010, has been disclaimed.

[21] Appl. No.: 304,414

[22] Filed: Sep. 12, 1994

Related U.S. Application Data

[60] Continuation of Ser. No. 972,603, Nov. 6, 1992, abandoned, which is a division of Ser. No. 728,890, Jul. 10, 1991, Pat. No. 5,201,542.

[51] Int. Cl.⁶ .................................... B60R 21/28
[52] U.S. Cl. ................................................. 280/741
[58] Field of Search ........................ 280/736, 741, 280/742; 102/530, 531; 422/164, 165, 166

[56] References Cited

U.S. PATENT DOCUMENTS

| 4,091,730 | 5/1978 | Dardick | 102/39 |
| 4,131,299 | 12/1978 | Ono et al. | 280/736 |
| 4,296,084 | 10/1981 | Adams et al. | 422/166 |
| 4,561,675 | 12/1985 | Adams et al. | 280/734 |
| 4,578,247 | 3/1986 | Bolieau | 280/741 |
| 4,711,466 | 12/1987 | Breed . | |
| 5,000,479 | 3/1991 | Werner et al. | 280/736 |
| 5,273,722 | 12/1993 | Högenauer et al. | 280/736 |

FOREIGN PATENT DOCUMENTS

| 3630685 | 2/1988 | Germany . | |
| 3742383 | 6/1989 | Germany | 280/736 |

Primary Examiner—Eric D. Culbreth
Assistant Examiner—Paul N. Dickson
Attorney, Agent, or Firm—Kane, Dalsimer, Sullivan, Kurucz, Levy, Eisele and Richard

[57] ABSTRACT

An inflator for an air bag-type passenger restraint system for a motor vehicle includes two cup-shaped members which are joined to form chambers for a gas generator and activating devices for activating the gas generator. The two members are coupled by threads which do not increase the weight of the inflator. The inflator also includes a filter for filtering particulate matter from the gas generator.

20 Claims, 2 Drawing Sheets 5,544,916

TWO PIECE INFLATOR HOUSING

This is a continuation of application Ser. No. 07/972,603, filed on Nov. 6, 1992, now abandoned, which is a divisional of Ser. No. 07/728,890, filed on Jul. 10, 1991, now U.S. Pat. No. 5,201,542.

BACKGROUND OF THE INVENTION

A. Field of Invention

This invention pertains to an air bag passenger restraint system, and more particularly to a housing for the components used to inflate the air bag in such a system.

B. Description of the Prior Art

Active passenger restraint systems and more particularly, restraint systems with air bags have proved to be very effective in preventing serious injury and even death in motor vehicles involved in crashes. Typically, these systems include an inflator housing containing chemical agents which may be triggered, for example by a crash, to generate a large volume of gas. The housing is arranged and constructed so that the gas is channeled to a bag which inflates. Thus, the bag cushions the body of the passengers.

Early gas generator or inflator designs comprised two metal cups which were held together on their circumference to form a pressure chamber. As pressures typically reach 2000 psi within a gas generator, the wall thickness of these cups had to be sufficient to withstand this pressure typically with a safety factor of 2. These cups were typically held together by welding, threads, or by mechanically bending one cup around the other.

In an effort to reduce the overall weight of the gas generator by reducing the wall thickness of the cups, means were sought to provide a physical attachment of the two cup halves at some inner diameter. In one prior art configuration, in addition to the peripheral attachment, an inner bolt circle of rivets was used to provide this additional attachment as well as a separate two-piece threaded member that served both to hold the electric squib as well as provide mechanical attachment of the upper and lower half. The outer periphery of this type of inflator was welded.

Another configuration utilized a butt welding technique wherein the two cup halves were friction-welded together at both the peripheral diameter as well as an inner diameter. Yet other configurations utilized several interconnecting cup members which were laser or electron-beam welded together to form the desired multi-attachments of the gas generator pressure chamber. Some prior art inflator housings are shown in U.S. Pat. Nos. 4,711,466; and 4,561,675. However, it has been found that assembling inflator housings by welding is undesirable because it increases their cost of manufacture and weight. Moreover, in some instances it may be advantageous to be able to disassemble a completed housing, for example for quality control, or to replace defective or old chemical agents. However, a welded housing is difficult to take apart.

OBJECTIVES AND SUMMARY OF THE INVENTION

In view of these disadvantages of the prior art, an objective of the present invention is to provide in inflator housing which can be assembled inexpensively.

A further objective is to provide an inflator housing which is assembled without any increase in weight.

A further objective is to provide an inflator housing which can be easily disassembled when required.

Other objectives and advantages of the invention shall become apparent from the following description. An inflator housing is constructed in accordance with this invention from two cup members which cooperate to form chambers for holding a primer, and the chemical agents which can be activated to generated a gas. Each of the cups is formed with mating means for threadedly engaging the other cup.

Advancements over the last ten years in production machine tool technology has made it possible to machine concentric threads on two different diameters which start at the same point, thus permitting such a machined member to be attached to a second machined member having also two mating machine threads starting at the same point. This technique is thus ideally suited for attaching two inflator cups to form a pressure chamber for the physical attachment occurring at both the outer diameter as well as a second inner diameter. This double attachment technique permits reducing the wall thickness of the inflator halves thereby reducing the inflator weight for the same internal pressure requirements, as well as providing the necessary two pressure chambers within the inflator—one to hold the enhancer or primer material and the second to hold the primary gas generate material. For maximum pressure holding capability a buttress thread design is used for all threads.

The double threaded housing can be made of aluminum. To achieve even reductions in weight and manufacturing costs plastic housings have also been molded. It is believed that this screwed together inflator technique is probably the only practical means of attaching plastic housings.

This screwed together inflator configuration is both applicable to electric squib initiation wherein an external crash sensor closes an electrical circuit across the squib to initiate gas generation when an air bag is needed, as well as a completely self-contained sensor initiator incorporation a stab primer contained within the gas generator.

DETAILED DESCRIPTION OF THE INVENTION

Figure 1:
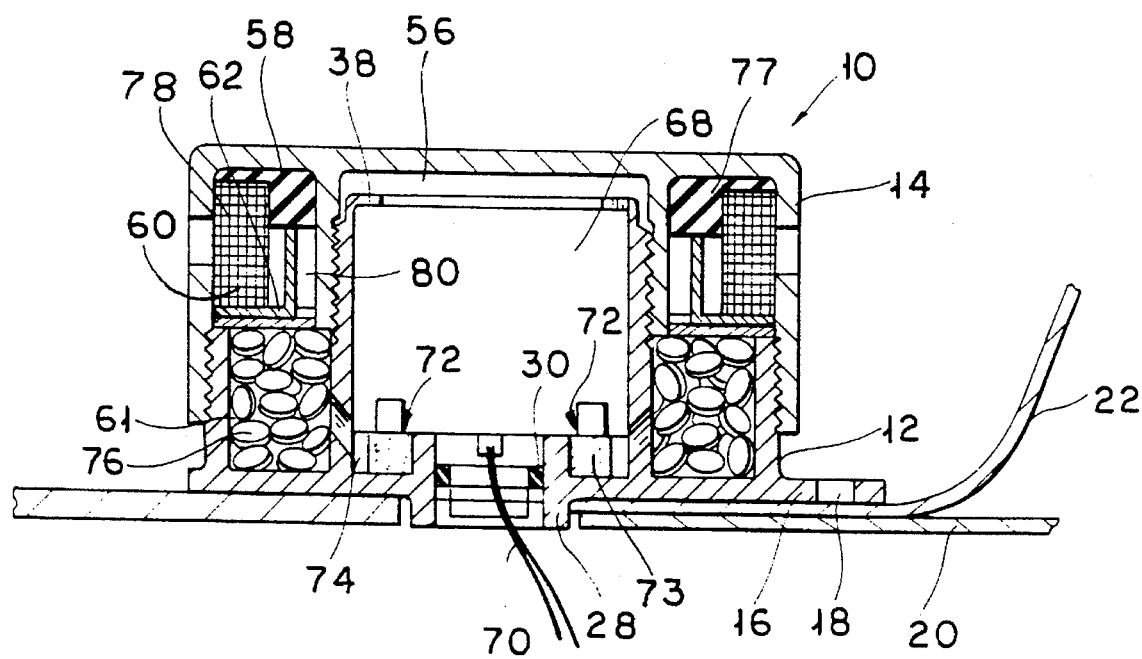
FIG. 1 shows an elevational view of an inflator housing constructed in accordance with this invention.
Figure 2:
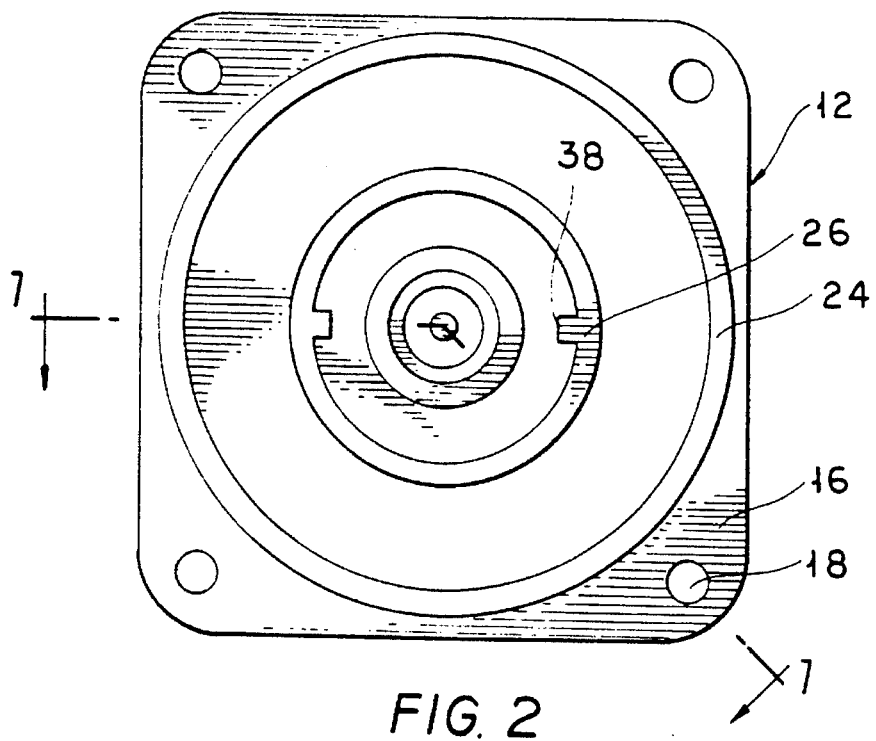
FIG. 2 shows a top view of the lower cup of the housing of FIG. 1.

Referring now to the Figures, an inflator housing 10 is composed of two cups, a lower cup 12 and an upper cup 14 made, for example, of aluminum or an aluminum alloy. Alternatively, the cups may be molded of a plastic material. The lower cup includes a substantially square base 16 with several mounting holes 18. Base 16 permits the housing 10 to be mounted on a surface 20, which may for example be part of the steering wheel or the glove compartment of a motor vehicle. The housing is also secured to an air bag, a portion of which is shown in FIG. 1 as at 22. The air bag surrounds the housing so that gases generated therein can inflate the air bag.

Figure 3:
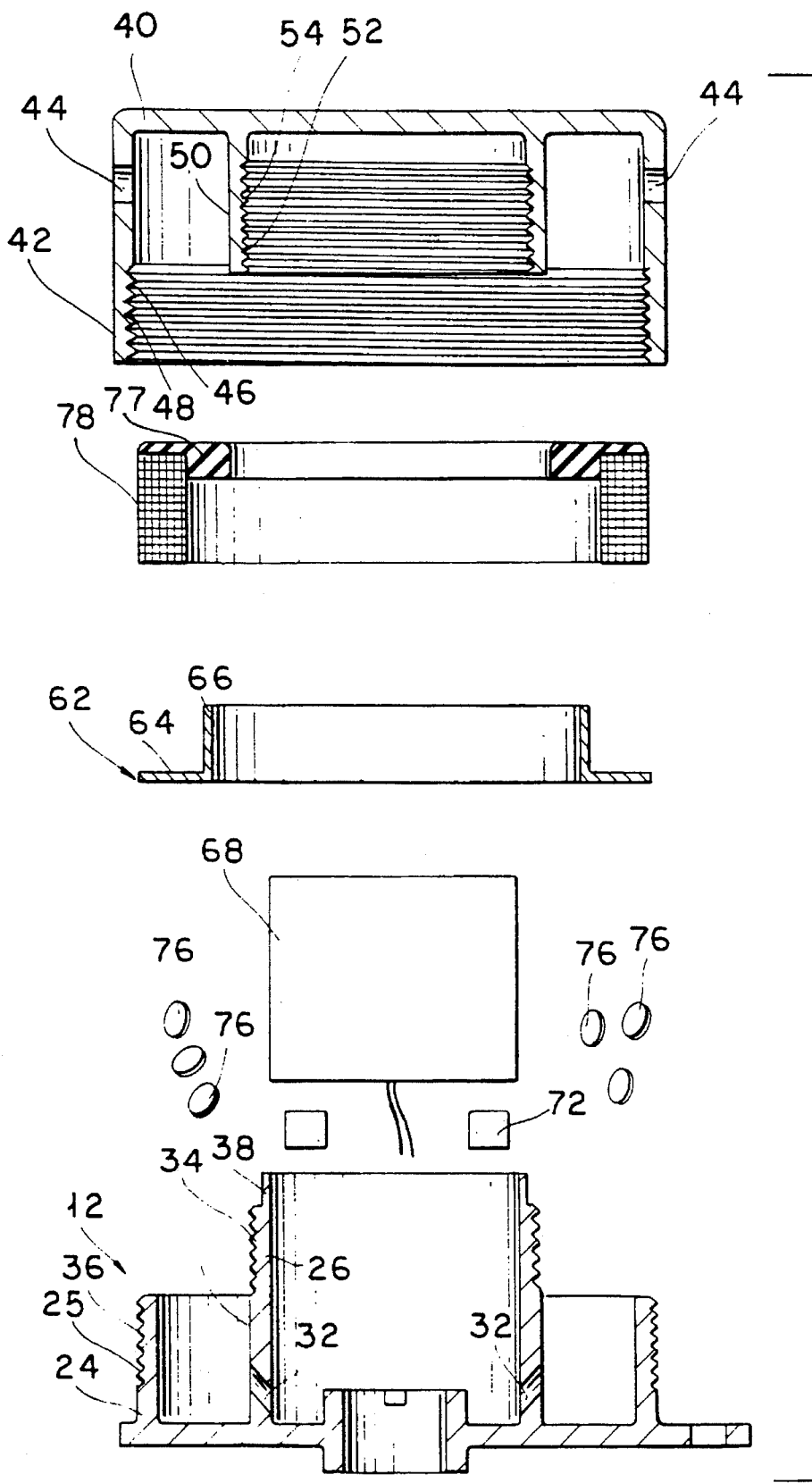
FIG. 3 shows an exploded view of the housing of FIGS. 1 and 2.

As shown in more detail in FIG. 3, extending upwardly from base 16, lower cup 12 has an outer cylindrical wall 24. Wall 24 may rise for a distance which is about half the thickness of the housing 10. Lower cup 12 also is provided with an inner cylindrical wall 26 disposed concentrically with outer wall 24 the outside diameter of cylindrical wall 24 being larger than that of cylindrical wall 26 as shown in the figures. Inner wall 26 extends substantially through the whole thickness of the housing. Also formed in base 16 is a tubular wall 28 extending through the base to hold a rubber grommet 30.

Wall 26 is formed with a plurality of holes 32. Preferably these holes are angled at about 45°. At least the upper portion of wall 26 has threads 34 on its outer surface 27. Similarly wall 24 has an upper section with threads 36 on its outer surface 25. At the top, wall 26 is formed with an annular thin web 38.

Upper cup 14 is formed with a substantially circular plate 40. An outer cylindrical wall 42 extends downwardly from plate 40 as shown in FIG. 3. This wall 42 is formed with a plurality of venting holes 44. The inner surface 46 of wall 42 is formed with threads 48 at a pitch matching the pitch of the threads 36 on wall 24. Upper cup 14 also has an inner cylindrical wall 50 disposed concentrically with respect to outer wall 42, the outside diameter of cylindrical wall 42 being larger than that of cylindrical wall 50 as shown in the figures. Accordingly, the outside diameter of cylindrical wall 42 is larger than that of cylindrical wall 24 and the outside diameter of cylindrical wall 50 is larger than that of cylindrical wall 26. Inner wall 50 has an inner surface 52 which also has threads 54 at a pitch which matches the pitch of the threads 34 on wall 26. The two cups 12, 14 are sized and shaped so that they can be joined together to form the inflator housing 10 by placing the upper cup 14 over the lower 12 and turning one or both to engage the threads. Importantly the two sets of threads 36/48 and 34/54 engage simultaneously. When assembled, the two cups form two chambers: a central cylindrical chamber 56, and an annular chamber 58 disposed concentrically around chamber 56. Chamber 58 is partitioned into an upper section 60 and a lower section 61 by a ring 62. As shown in FIG. 3, preferably, ring 62 consists of flat portion 64 extending substantially radially and joined to a tubular section 66 extending substantially axially. In other words, ring 62 has a generally L-shaped cross-section.

An acceleration sensor 68 is disposed in central chamber 56. Sensor 68 may be either a mechanical sensor or an electrical sensor. The electrical sensor may be provided with an electrical cable 70 passing through grommet 30 to provide power to the sensor if required. As shown in FIG. 1, sensor 68 sits in the upper part of chamber 56. If necessary, one or more primer capsules 72 may also be provided in a lower annular section 74 of the chamber 56 defined between the upper section of cylindrical wall 28 and wall 26. Primer 72 is disposed on top of a $BKNO_3$ powder mix 73. The lower section 61 of chamber 58 is used to hold a plurality of capsules 76 which when ignited generate a gas. The upper section 60 of chamber 58 is used to hold a filter assembly 78.

The inflator housing 10 is assembled as follows. First, the primer 72, mix 73 and the acceleration sensor 68 are positioned within wall 26. Cable 70 (if provided) is passed through the grommet 30 for later connection to a power supply and (optionally) to a sensor monitoring means not shown. In order to keep the sensor in place, the web 38 on wall 26 is bent radially inwardly to the position shown in FIG. 1. Capsules 76 are installed in the annular space between walls 24 and 26. Next, ring 62 is placed so that it sits on top of wall 24. Importantly, in this position, a narrow annular passage 80 is formed between portion 66 of ring 62 and wall 26. Finally, a filter assembly consisting of a primary slag filter 77 and a secondary filter mesh 78 is placed on top ring 62. The upper cup 14 is then placed over the lower cup 12 and one or both cups 12, 14 are twisted to engage the threads. This action is continued until the two cups are firmly interlocked, as shown in FIG. 1. The inflator housing is then installed into a motor vehicle as described above.

The inflator housing operates as follows. When the motor vehicle is involved in a crash, it undergoes a deceleration. If this deceleration exceeds a certain preset level, the acceleration sensor 68 activates primer 72. The primer ignites $BKNO_3$ powder 73 which in turn initiates capsules 76 through holes 32. The ignited capsules 76 generate chemically a large volume of gases, as well as particulate matter which is a byproduct of the chemical reactions resulting from the burning of the capsules. The gases flow through passageway 80 and then out through primary and secondary filters 77, 78 and holes 44. The particulate matter entrained in the gases is picked up by the primary slag filter 77. The generation of gas takes place at a high temperature and pressure relative to ambient conditions. One skilled in the art will recognize that the two sets of threads perform two functions in the inflator housing: they are used as a pressure resistant coupling between the two cups so that they do not fly apart as a result of the high pressure; and they insure that the chambers within the housing are hermetically sealed so that gas generated within the outer chamber 58 does not interfere with the operation of sensor 68.

Obviously numerous modifications can be made to the invention without departing from its scope as defined in the appended claims.

We claim:

1. An inflator for a motor vehicle passenger restraint system, said inflator comprising:

a two piece housing including first and second members threadedly engaged to form at least a first and a second chamber with a portion of the first member and a portion of the second member defining a cylindrical wall between the first and second chambers, said portions having threads for engaging the members, said members each including an outer wall with outer wall threads for engaging said members, said portions and said outer walls being partially overlapped in an axial direction;

the threads of the portions and outer walls being so constructed and arranged for interlocking said portions and outer walls together in a radial direction;

said first member being of one piece construction and said second member also being of one piece construction; the threads of the portions and said outer walls having matching thread pitches so that the threads of said respective portions and outer walls engage simultaneously to provide a pressure resistant coupling of the members and cooperate in providing a seal of the chambers;

gas generator means disposed in said first chamber; and activating means disposed in said second chamber for activating said gas generator means.

2. The inflator of claim 1 wherein said generator means generates particulate matter, said inflator including filter means for filtering said particulate matter.

3. The inflator of claim 1 wherein said activating means includes a primer for igniting said generator means, and an acceleration sensor for triggering said primer.

4. An inflator for an air bag system in a motor vehicle, said inflator comprising:

a two piece inflator housing including a first cup having a first cup portion and a second cup having a second cup portion, each cup portion having an inner cylindrical and an outer cylindrical wall and each cup being of one-piece construction; said cups when engaged cooperating to form an inner chamber and an outer chamber disposed around said inner chamber, the walls of said first cup portion having a different diameter than the walls of said second cup portion;

each said inner and outer cylindrical walls have threads for coupling said cups;

said inner walls of said first and second cups respectively and said outer walls of said first and second cups respectively are partially overlapped in an axial direction and said inner walls of said first and second cups respectively and said outer walls of said first and second cups respectively are coupled together in a radial direction by the threads, the threads of the inner walls of said first and second cups respectively and said outer walls of said first and second cups respectively having matching thread pitches so that the threads of the respective walls engage to provide a pressure resistant coupling of the cups and cooperate in providing a seal of the chambers;

gas generator means disposed in said outer chamber; and activating means disposed in said inner chamber for activating said gas generator means.

5. The inflator of claim 4 further comprising a ring for partitioning said outer chamber into a first section and a second section, said gas generator means being disposed in said first section.

6. The inflator of claim 5 further comprising filter means disposed in said second section for filtering particulate matter from said gas generator means.

7. The inflator of claim 4 wherein said activating means includes accelerator sensor means for sensing the acceleration of said motor vehicle, and primer means triggered by said sensor means.

8. The inflator of claim 7 wherein said primer means releases primer gases and wherein said inner wall has access holes for releasing said primer gas into said outer chamber.

9. The inflator of claim 4 wherein said first and second cups are made of aluminum.

10. The inflator of claim 4 wherein said first and second cups are made of a plastic material.

11. The inflator of the claim 4 wherein each said inner and outer cylindrical walls have threads for coupling said cups.

12. A two piece inflator housing for a motor vehicle passenger restraint system, said inflator housing comprising:

a two piece housing including first and second members threadedly engaged to form at least a first and a second chamber with a portion of the first member and a portion of the second member defining a cylindrical wall between the first and second chambers, said portions having mating threads for engaging the members, said members each including an outer wall with mating threads for engaging said members; said portions and walls being partially overlapped in an axial direction;

the threads of the portions and outer walls coupling said portions and outer walls together in a radial direction;

said first member being of one piece construction and said second member also being of one piece construction; the threads of the portions and outer walls having matching thread pitches so that the threads of the portions and outer walls engage simultaneously to provide a pressure resistant coupling of the members and cooperate in providing a seal of the chambers;

said first chamber being adapted to receive a gas generator means; and the second chamber adapted to receive activating means for activating said gas generator means.

13. An inflator for an air bag system in a motor vehicle, said inflator comprising:

a two piece inflator housing including a first cup having a first cup portion and a second cup having a second cup portion, each cup having an inner cylindrical and an outer cylindrical wall with each wall having an outer surface and each cup being of one-piece construction; said cups when engaged cooperating to form an inner chamber and an outer chamber disposed around said inner chamber, the outer surface of said walls of said first cup portion having a different diameter than the outer surface of walls of said second cup portion;

each said inner and outer cylindrical walls have threads for coupling said cups;

said walls are partially overlapped in an axial direction and said walls are coupled together in a radial direction by the threads, the threads of the walls having matching thread pitches so that the threads of the walls engage simultaneously to provide a pressure resistant coupling of the cups and cooperate in providing a seal of the chambers;

the outer chamber being adapted to receive a gas generator means; and the inner chamber adapted to receive activating means for activating the gas generator means.

14. An inflator for a motor vehicle passenger restraint system, said inflator comprising:

a first member having a first member base, a first member circular inner wall mounted transversely on said first member base, and a first member circular outer wall mounted transversely on said base annularly around said first member inner wall, said first member walls being threaded and being formed integrally with said first member base;

a second member having a second member base, a second member circular inner wall mounted transversely on said second member base, and a second circular outer wall mounted transversely on said second member base anularly around said second member inner wall, said second member walls being threaded and being formed integrally with said second member base;

said first and second members being coupled by threadedly engaging said first member inner wall and said second member inner wall and by threadedly engaging said first member outer wall and said second member outer wall to form an inner and outer chamber respectively;

gas generator means disposed in said outer chamber; and gas generator activating means disposed in said inner chamber for activating said gas generator means to produce an inflator gas.

15. The inflator of claim 14 wherein said first member walls each have an outer surface with outer surface threads, and each of second member walls has an inner surface with inner surface threads for engaging said outer surface threads.

16. The inflator of claim 14 wherein one of said outer walls has outer orifices for venting said inflator gas.

17. The inflator of claim 14 wherein said activating means includes a primer for generating a primer gas, and inner orifices for venting said primer gas to said outer chamber.

18. A gas generator comprising:

a housing shell and a cover, said housing shell being formed of a single integral piece and said cover being formed of a single integral piece, each of said housing shell and said cover including opposing axially inwardly directed annular webs with engaging threaded portions, said threaded portions being dimensioned to achieve a connection upon screwing said housing shell and said cover together, said threaded portions including threaded parts for engaging a counterpart for a screwed fit of said housing shell and said cover, said webs including a housing shell first web and a cover first web, said housing shell first web and cover first web being connected and cooperating to define a central area for receiving an igniter firmly held between said housing shell and said cover, said webs including a housing shell second web and a cover second web, said housing shell second web and said cover second web being connected and cooperating to define an adjacent propellant chamber surrounding said central area, propellant being positioned in said propellant chamber firmly held between said housing shell and said cover, said propellant chamber being delimited in a radially outward direction by said housing shell second web and said cover second web, said housing shell and said cover defining a filter chamber, filter elements being positioned in said filter chamber firmly held between said housing shell and said cover.

19. A gas generator according to claim 18, wherein: ring means are positioned in said filter chamber for establishing forced flow.

20. A gas generator comprising:

a housing shell formed of a single integral piece of aluminum or aluminum alloy, said housing shell including a housing shell first annular web extending axially inwardly from a housing shell interior surface and a housing shell second annular web extending axially inwardly from said housing shell interior surface, said housing shell second annular web being spaced from an outer end of said housing shell;

a cover formed of a single integral piece of aluminum or aluminum alloy said cover including a cover first annular web extending axially inwardly from a cover interior surface and a cover second annular web extending axially inwardly from said cover interior surface, said cover second annular web being spaced from said cover first annular web;

thread engagement means for connecting said housing shell and said cover, said housing shell first web and cover first web being connected and cooperating to define a central area for receiving an igniter firmly held between said housing shell and said cover, an adjacent propellant chamber being defined surrounding said housing shell first web and cover first web, propellant being positioned in said propellant chamber firmly held between said housing shell and said cover, said propellant chamber being delimited in a radially outward direction by said housing shell second web and said cover second web with outlet openings for propellant gas to flow therethrough, said housing shell and said cover defining a filter chamber, filter elements being positioned in said filter chamber firmly held between said housing shell and said cover, said thread engagement means including engaging threaded portions provided on each of said housing first web, said housing second web, said cover first web and said cover second web, and including screw means provided on said threaded portions for establishing a connection between webs of said housing shell and said cover.

* * * * *